United States Patent
Wang et al.

(10) Patent No.: US 11,821,542 B1
(45) Date of Patent: Nov. 21, 2023

(54) REMOTE FAULT MONITORING SYSTEM FOR ELECTRIC VALVE

(71) Applicant: SOOCHOW UNIVERSITY, Suzhou (CN)

(72) Inventors: Yihuai Wang, Suzhou (CN); Jianzhong Ye, Suzhou (CN); Wen Zhang, Yihuai (CN); Xiaohu Ma, Suzhou (CN); Dong Han, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 0 days.

(21) Appl. No.: 18/025,885

(22) PCT Filed: Aug. 31, 2022

(86) PCT No.: PCT/CN2022/116050
§ 371 (c)(1),
(2) Date: Mar. 11, 2023

(30) Foreign Application Priority Data

Jun. 10, 2022 (CN) ......................... 202210657953.X

(51) Int. Cl.
*F16K 37/00* (2006.01)
*H04L 9/32* (2006.01)
*H04L 9/08* (2006.01)

(52) U.S. Cl.
CPC .......... *F16K 37/0083* (2013.01); *H04L 9/085* (2013.01); *H04L 9/321* (2013.01)

(58) Field of Classification Search
CPC ................................................ F16K 37/0083
(Continued)

(56) References Cited

U.S. PATENT DOCUMENTS

2018/0216664 A1 8/2018 Mushi
2020/0064797 A1* 2/2020 Hannon ................ H04L 63/104

FOREIGN PATENT DOCUMENTS

CN 208421587 U 1/2019
CN 109974770 A 7/2019
(Continued)

OTHER PUBLICATIONS

Ye et al. Machine Translation of CN 113341795 A. Published Sep. 2021. Accessed Jun. 2023. (Year: 2021).*
(Continued)

*Primary Examiner* — Walter L Lindsay, Jr.
*Assistant Examiner* — Philip T Fadul
(74) *Attorney, Agent, or Firm* — SZDC LAW P.C.

(57) ABSTRACT

A remote fault monitoring system for an electric valve includes: an MCU, a hydrogen sulfide sensor, a hydrogen sensor, a pull-press sensor and an actuating mechanism; the pull-press sensor is connected with an A/D conversion interface of the MCU by a signal amplifier, the hydrogen sulfide sensor and the hydrogen sensor are connected with the A/D conversion interface of the MCU by respective signal transmitters, and a D/A conversion interface of the MCU is connected with an opening-degree control port of the actuating mechanism by a voltage-to-current transmitter. An opening in-place signal and a closing in-place signal of the actuating mechanism are connected with a GPIO input interface of the MCU, and a GPIO output interface of the MCU is connected with an opening control port and a closing control port of the actuating mechanism by actuating mechanism relays.

9 Claims, 7 Drawing Sheets

(58) Field of Classification Search
USPC .......................................................... 73/865.9
See application file for complete search history.

(56) References Cited

FOREIGN PATENT DOCUMENTS

| CN | 209278597 U | 8/2019 |
| CN | 110300114 A | 10/2019 |
| CN | 113341795 A | 9/2021 |
| CN | 114879579 A | 8/2022 |

OTHER PUBLICATIONS

Zhao et al. Machine Translation of CN 209278597 U. Published Aug. 2019. Accessed Jun. 2023. (Year: 2019).*

* cited by examiner

| FlashData |
|---|
| equipName |
| equipID |
| equipType |
| companyName |
| serverIP |
| serverPort |
| sendFrequencySec |
| framecmd |

| UserData |
|---|
| cmd |
| Sn |
| IMSI |
| serverIP |
| serverPort |
| currentTime |
| sendFrequencySec |
| companyName |
| equipName |
| equipID |
| equipType |
| mcuTemp |
| signalPower |
| lbs_location |
| bright |
| rand |
| valvedata |
| threshold |

| |
|---|
| pullpress |
| h2sconcn |
| h2concn |
| switch_openstate |
| switch_closestate |
| switch_state |
| switch_control |
| switch_count |
| switch_opentime |
| switch_closetime |
| switch_time |

Fig. 7

REMOTE FAULT MONITORING SYSTEM FOR ELECTRIC VALVE

This application is the National Stage Application of PCT/CN2022/116050, filed on Aug. 31, 2022, which claims priority to Chinese Patent Application No. 202210657953.X, filed on Jun. 10, 2022, which is incorporated by reference for all purposes as if fully set forth herein.

FIELD OF THE DISCLOSURE

The present application relates to the field of control technologies for electric valves in chemical industry, and particularly to a remote fault monitoring system for an electric valve.

BACKGROUND OF THE DISCLOSURE

In chemical industry, volatile, flammable, explosive and toxic gases and liquids are mostly transported through pipelines, and valves are inevitably required to be used for control. In a traditional valve field control method, conditions of valve leakage, or the like, cannot be found in time. The valve is used as a key component in a pipeline system, and an improvement of an intelligent level thereof is a popular research problem in the chemical industry.

SUMMARY OF THE DISCLOSURE

In view of this, an object of the present application is to provide a remote fault monitoring system for an electric valve. In the present application, a general embedded computer (GEC) architecture serves as a base, a narrow band Internet of Things (NB-IoT) serves as a communication means, and two representative dangerous gases of hydrogen sulfide ($H_2S$) and hydrogen ($H_2$) are selected, so as to design and implement a maintainable remote fault monitoring system for an electric valve in chemical industry having good human-computer interaction and high safety.

A remote fault monitoring system for an electric valve, comprising:
  an MCU, a hydrogen sulfide sensor, a hydrogen sensor, a pull-press sensor and an actuating mechanism;
  wherein the pull-press sensor is connected with an A/D conversion interface of the MCU by a signal amplifier, the hydrogen sulfide sensor and the hydrogen sensor are connected with the A/D conversion interface of the MCU by respective signal transmitters, and a D/A conversion interface of the MCU is connected with an opening-degree control port of the actuating mechanism by a voltage-to-current transmitter.

Generally, the present application has the following advantages and user experiences: the system according to the present application can achieve expected functions thereof, a feasible solution and a practical case for remote fault monitoring of the electric valve in the chemical industry are provided, different actuating mechanisms and monitoring environments for different gases may be realized with simple changes, and quick expansion and reuse can be realized.

BRIEF DESCRIPTION OF DRAWINGS

FIG. 7 shows a diagram of a communication data structure of a terminal in an embodiment of the present application.

DETAILED DESCRIPTION OF PREFERRED EMBODIMENTS

The present application will be described in further detail with reference to the drawings and embodiments.

Figure 1:
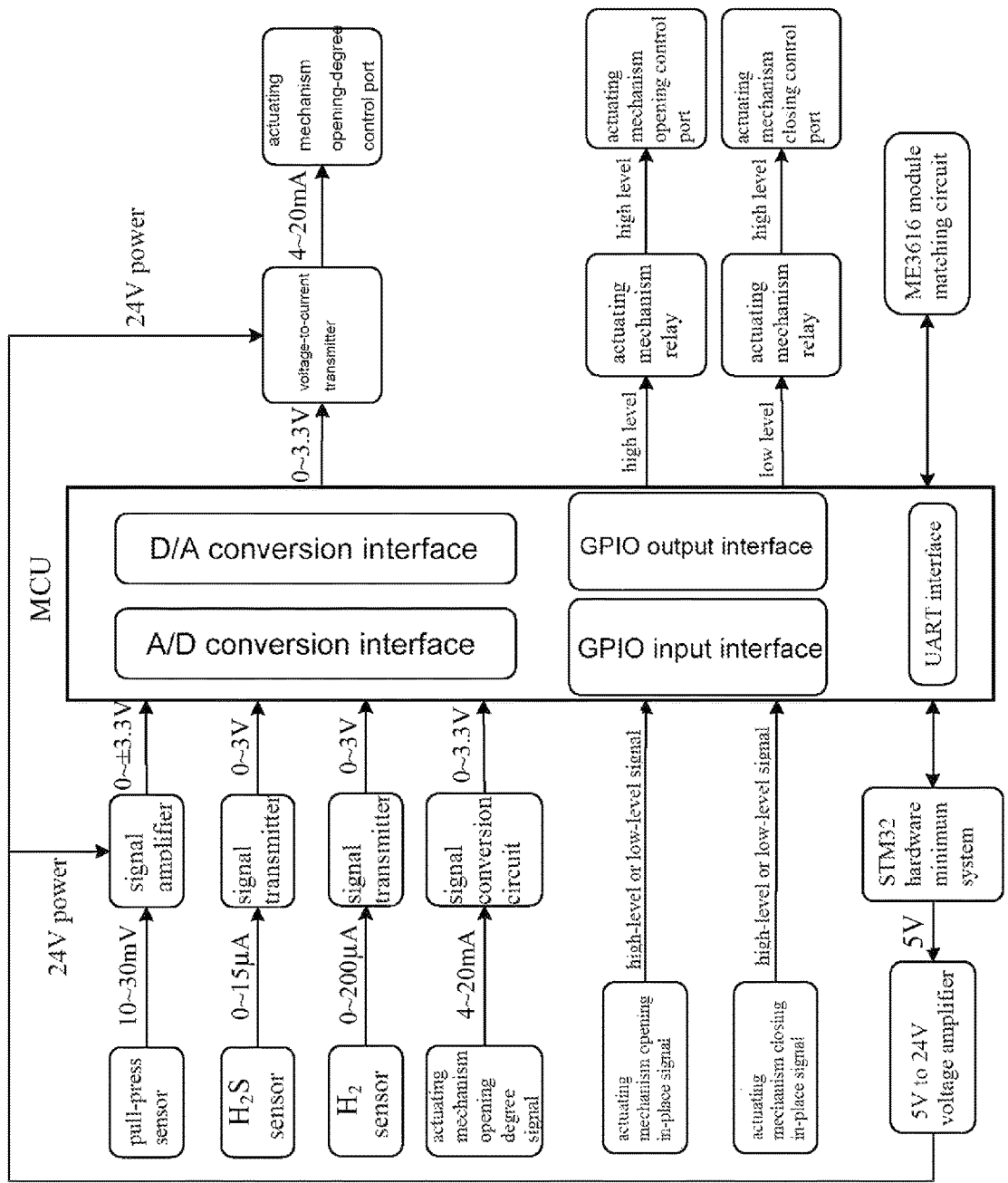
FIG. 1 shows a schematic principle diagram of an architecture of a remote fault monitoring system for an electric valve according to the present application.

A terminal system framework used by a system is shown in FIG. 1. The system includes an MCU, a hydrogen sulfide sensor, a hydrogen sensor, a pull-press sensor and an actuating mechanism; the pull-press sensor is connected with an A/D conversion interface of the MCU by a signal amplifier, the hydrogen sulfide sensor and the hydrogen sensor are connected with the A/D conversion interface of the MCU by respective signal transmitters, and a D/A conversion interface of the MCU is connected with an opening-degree control port of the actuating mechanism by a voltage-to-current transmitter. An opening in-place signal and a closing in-place signal of the actuating mechanism are connected with a GPIO input interface of the MCU, and a GPIO output interface of the MCU is connected with an opening control port and a closing control port of the actuating mechanism by actuating mechanism relays. The system further includes an ME3616 module matching circuit and an STM32 hardware minimum system which are connected with a UART interface of the MCU, and the STM32 hardware minimum system is also connected with the signal amplifier and the voltage-to-current transmitter by a 5V to 24V voltage amplifier.

Terminal hardware includes a basic hardware platform and valve-related modules. The basic hardware platform aims at achieving functions of sensor sampling, transmission, calculation, control, or the like, and input-output pin correspondence is listed in table 1 according to system requirements and a chip manual; spare pins of the basic hardware platform and required functional peripheral pins are connected out to provide external interfaces for sensors and actuating mechanisms related to valves, and VCC, GND, ADC, GPIO, or the like, required by all external modules are packaged into unified interfaces, so as to meet access requirements of various sensors and actuating mechanisms and meanwhile provide possibility for subsequent expansion.

TABLE 1

Input-output pin correspondence

| Serial number | Function | Peripheral type | Direction | Pin | Description |
|---|---|---|---|---|---|
| 1 | Pull-press value signal+ | ADC | Input | PTC 2 | Measuring a value of a differential signal+ of the pull-press sensor |
| 2 | Pull-press value signal− | ADC | Input | PTC 0 | Measuring a value of a differential signal− of the pull-press sensor |
| 3 | $H_2S$ concentration | ADC | Input | PTA 6 | Measuring a signal value of the $H_2S$ concentration |
| 4 | $H_2$ concentration | ADC | Input | PTC 3 | Measuring a signal value of the $H_2$ concentration |
| 5 | Valve closing in-place signal | GPIO | Input | PTC 4 | The actuating mechanism controls the valve to be opened in place, and a high level is input |
| 6 | Valve opening in-place signal | GPIO | Input | PTC 5 | The actuating mechanism controls the valve to be closed in place, and a high level is input |
| 7 | Valve opening-degree measuring signal | ADC | Input | PTC 1 | Adjusting-type actuating mechanism opening-degree voltage signal A switch-type actuating mechanism outputs high and low levels through the |
| 8 | Valve opening-degree control signal | GPIO/DAC | Output | PTA 4 | GPIO to control the valve to be opened and closed; an adjusting-type actuating mechanism outputs corresponding voltage signals through the DAC to control the valve to rotate |

In the present application, the electric valve terminal software and hardware are designed according to a software and hardware component-based design idea. On the basis of a GEC architecture, software components of the sensor and the actuating mechanism are completed; functions of data summarization, data sending and equipment control are achieved by a main program, and partial data collection is realized by an interrupt processing program. The terminal software is designed based on generality of terminal node hardware, thus improving portability and achieving accuracy of terminal node data collection and stability of equipment control.

1. Terminal Function Analysis

Stability and accuracy of the system terminal software and hardware are premises of correctly measuring and calculating related signals and ambient environment conditions of an electric valve, and accurate collection of signals and data is the key for guaranteeing normal operation of the valve and is also a basis for fault monitoring of the electric valve.

In chemical industry, generally, internal harmful media are prone to leakage in key device and equipment regions. Since pipelines are located at stable static positions after mounted, leakage is relatively less in service life when standard specification requirements are met. Transmission equipment, such as pressure pumps, control valves, or the like, is in continuous or frequent operation and opening-closing action states, and possibility of leakage of the internal media is extremely high. The control valve is generally mounted at a front end or a rear end of the pressure pump or at a key position in a device, and controls a flow, a pressure, a temperature, or the like, of the high-risk media in real time. Therefore, the remote fault monitoring system for a valve is selected to be built in the control valves at the key positions to monitor harsh environments and key regions in factories in the chemical industry.

Meanwhile, pipeline fluid media in the chemical industry include a plurality of media acting at a high temperature and a high pressure, and volatile, flammable and explosive gases and liquids tend to cause the leakage of the pipeline and the valve. The main media causing this phenomenon include volatile liquids (such as gasoline, aviation kerosene, liquid chlorine, hydrocarbons, or the like), fuel gases, chlorine, hydrogen, or the like, most of the gases leaking and volatilizing into air contain components harmful to human bodies, such as hydrogen sulfide ($H_2S$), or the like, and hydrogen ($H_2$) is most representative of the volatile gases.

In summary, the valve of the system is a 0→90-degree rotation ball valve to monitor two gases of $H_2S$ and $H_2$, and meanwhile, the terminal software and hardware of the remote fault monitoring system for an electric valve are designed in conjunction with relevant data of the electric actuating mechanism and basic data of the environment, and specific design targets are as following.

(1) Accurate data collection. A terminal is mainly used for providing accurate data for an application layer, and data collected by the system mainly includes: an $H_2S$ or $H_2$ gas concentration in ambient gases, a terminal chip temperature, signal strength, and a torque when the actuating mechanism drives the valve to rotate.

(2) Accurate control over opening-closing angle of valve. An opening-closing signal and an opening degree signal of the electric actuating mechanism as well as a rotation time of the actuating mechanism when opening or closing is in place are acquired in real time. The valve can be subjected to high-precision opening-closing control and angle control while state data of the actuating mechanism is accurately acquired.

(3) High robustness of terminal equipment. Selection of the terminal hardware should reach the industrial protection level IP67; the design of the terminal software guarantees a high fault tolerance and strong portability. Meanwhile, the equipment is inspected at regular time to ensure that the terminal equipment can continuously carry out data collection and valve control monitoring work.

Basic dynamic parameters used by the system are shown in table 2. The chip temperature and the signal intensity are obtained by a main control chip and an NB-IoT module, and physical quantities with serial numbers 3-9 are obtained by the sensors and the electric actuating mechanism. All data are integrated by the main control chip and then sent by the NB-IoT module.

TABLE 2

Basic dynamic parameter of system

| Serial number | Physical quantity name | Value source | Unit | Measurement range | Alarm or not |
|---|---|---|---|---|---|
| 1 | Chip temperature | Actual measurement | °C. | −40→85 | Yes |
| 2 | Signal intensity | Actual measurement | dBm | −113→−51 | Yes |
| 3 | Pull-press value | Actual measurement | N | 0→±500 | Yes |
| 4 | H₂S concentration | Actual measurement | ppm | 0→100 | Yes |
| 5 | H₂ concentration | Actual measurement | ppm | 0→40,000 | Yes |
| 6 | Valve opening degree | Formula calculation | Degree | 0→90 | No |
| 7 | Valve closing in-place signal | Actual measurement | None | 0/1 | No |
| 8 | Valve opening in-place signal | Actual measurement | None | 0/1 | No |
| 9 | Valve opening-closing time | Formula calculation | Second | 0→120 | Yes |

2. Terminal Hardware Selection and Construction

The electric valve terminal hardware includes the basic hardware platform, the sensor and the electric actuating mechanism, and the basic hardware platform includes the main control chip and the NB-IoT module. This section explains the selection of other equipment and the construction of the terminal hardware.

2.1. Sensor Selection and Interface Design

The basic hardware platform collects relevant data by the sensor, and reliability of data collection is related to safety of production and operation of the terminal equipment and the complex chemical industry environment. This section describes in detail a sensor selection standard used by the terminal and the circuit design of an interface connected into a development board.

1. Torque Collection Module

In the system, the pull-press sensor is used to measure the torque when the valve rotates. The electric actuating mechanism controls the valve to rotate through a worm and worm wheel structure, the actuating mechanism controls a worm to drive a worm wheel to rotate, and the worm wheel is subjected to different torques to subject the worm to reaction forces. The ball valve selected in the system has a model of HQ941F16-50 and a safe torque range of 0→30N, and the pull-press force value is collected in real time by the pull-press sensor sensing the reaction force of the worm, so as to ensure that the torque of a valve rod of the valve is in a normal range to guarantee normal operation of the valve.

In the system, a BSLM-6 diaphragm capsule pull-press sensor is selected to carry out torque measurement in conjunction with a BSFY-1 single-channel sensor signal voltage transmitter, a rated measurement range is 0→±50 KG, output sensitivity is 2.0 mV/V, a working temperature is −35° C.→80° C., and the protection level is IP67, such that requirements of the system for monitoring of the rotation torque of the valve are met.

Figure 2:
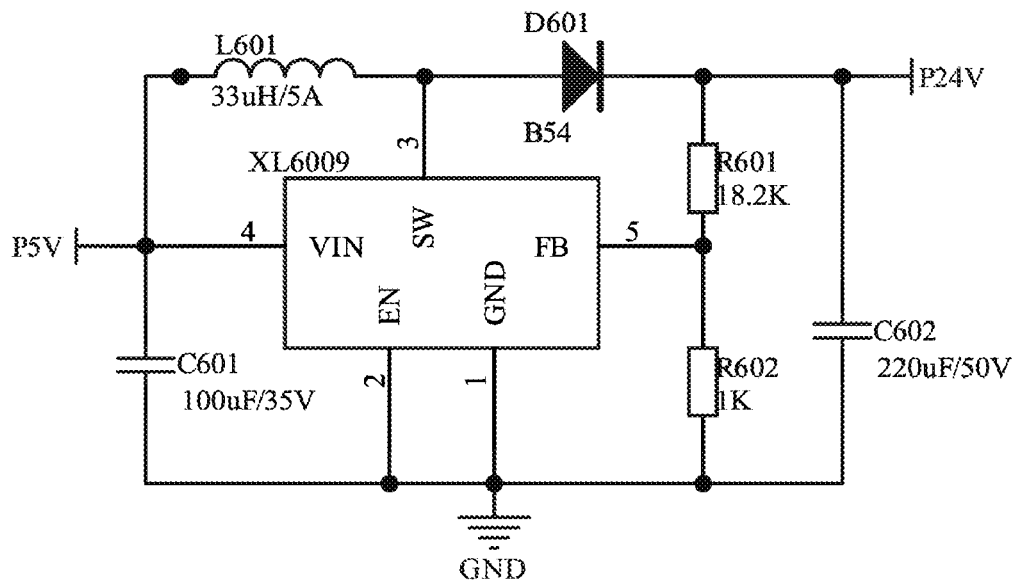
FIG. 2 shows a principle diagram of a 5V to 24V circuit in an embodiment of the present application.

The BSLM-6 diaphragm capsule pull-press sensor is a five-wire sensor, a diaphragm on the sensor may generate a displacement under the action of a pull-press force, and the displacement is in direct proportion to the pull-press force, such that an internal resistance of the sensor changes in the same proportion, and the change causes the sensor to output a standard signal corresponding to the pull-press value. The BSFY-1 single-channel sensor signal voltage transmitter has a supply voltage of 24V and is supplied with power using a 5V to 24V boosting module, and FIG. 2 is a principle diagram of the boosting circuit.

Figure 3:
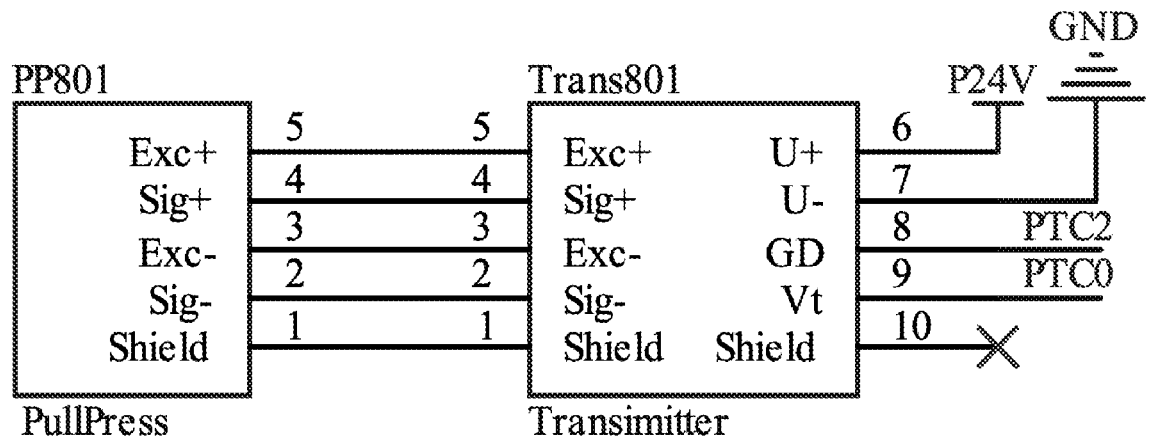
FIG. 3 shows a circuit diagram of an interface of a pull-press sensor.

In the boosting circuit, a VIN pin of an XL6009 chip is connected to 5V power supply of the development board, an FB pin is an output voltage sampling end, resistors R601 and R602 determine an output voltage of the boosting circuit, a calculation formula is $V_{out}=1.25\times(1+R602/R601)$, and the boosting circuit finally outputs a 24V voltage to supply power to the signal transmitter of the pull-press sensor. The pull-press sensor is connected with a corresponding port of the signal transmitter, the signal transmitter is connected into a corresponding ADC port of the main control chip through pins 8 and 9 after normal power supply, pull-press value analog signal data is then output, and a specific wiring method is shown in FIG. 3.

2. Hydrogen Sulfide Gas Collection Module

The hydrogen sulfide gas sensor is used in the system to monitor the concentration of the hydrogen sulfide gas in ambient air above the valve, and a highest allowable H₂S concentration in air of a workplace is 10 mg/m3 according to Hygienic Standard for the Design of Industrial Enterprises; that is, the hydrogen sulfide content in the air cannot exceed 6.6 ppm (parts per million).

In the system, a Honeywell 4HSC hydrogen sulfide gas sensor is selected to detect the H₂S concentration. The 4HSC sensor is a three-electrode micro catalytic oxidation sensor, and has a measurement range of 0→100 ppm, sensitivity of 0.7±0.15 μA/ppm and a maximum overload of 500 ppm, the measurement range is greater than or equal to three times the allowable concentration value of the hydrogen sulfide gas, a continuous working temperature range is −40° C.→+55° C., and requirements of the system for valve leakage monitoring can be met.

The 4HSC sensor includes a working electrode (W) for oxidizing or reducing a gas, a reference electrode (R) for stabilizing an electromotive force of the working electrode, and an auxiliary electrode (C) for reducing the gas reacted on the working electrode and forming an electrochemical circuit. When the to-be-detected flammable gas does not exist in the environment, a bridge between the electrode W and the electrode C is balanced, and the output signal is zero; when the flammable gas exists, the electrode W oxidizes the gas, the bridge between W and C is not balanced any more, and a signal value in direct proportion to the gas concentration is output. The output signal of the three-electrode electrochemical sensor during operation has a linear relationship with the gas concentration, and a specific calculation formula is as follows:

$$\text{output signal}(\mu A) \text{time effectiveness sensitivity } (\mu A/\text{ppm}) \times \text{gas concentration (ppm)}. \qquad (3.1)$$

Figure 4:
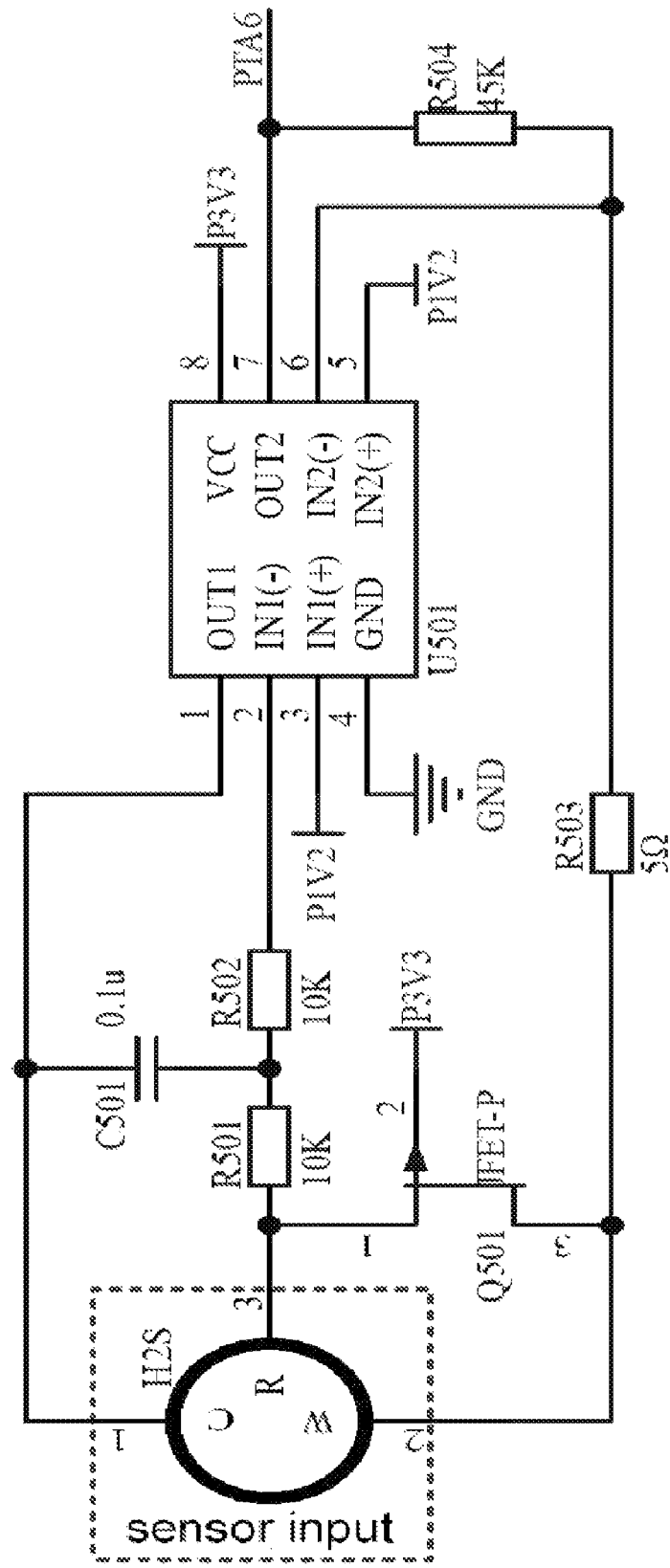
FIG. 4 shows a diagram of a sampling circuit of a gas sensor in an embodiment of the present application.

In order to ensure that the Honeywell electrochemical sensor can work normally, an amplification circuit shown in FIG. 4 is used for acquiring sensor data. The sampling circuit is designed by referring to the S-series gas sensor use guide officially provided by Honeywell, a Q501 field effect transistor is used for short-circuiting the electrodes R and W to ensure that the gas sensor can be used when a power source is not connected, and meanwhile, a bias voltage is provided on U501 through C501, R501 and R502. R503 is a load resistor, and is set to 5Ω by referring to a sensor specification, a signal output through the load resistor is 0→70 μA, R504 is a 45K gain resistor, and a signal input to a PTA6 pin is 0→3.29V.

3. Hydrogen Gas Collection Module

The hydrogen sensor is used in the system to monitor the concentration of the hydrogen in the ambient air above the valve, known as an $H_2$ explosive volume concentration having a lower limit of 4.0% and an upper limit of 75%. During actual operation, only the hydrogen concentration is required to be measured to ensure that the hydrogen concentration is not higher than the lower limit of the explosive concentration.

The hydrogen gas collection module is a Honeywell $4H_2$-40000 sensor and has a model of CLE-0644-400. The sensor has a measurement range of 0→40,000 ppm, sensitivity of 0.007±0.002 μA/ppm, and a working temperature range of −20° C.→50° C., and requirements of the system for $H_2$ concentration monitoring are met. A measurement principle of the hydrogen sensor and a design of the sensor sampling circuit are similar to those of the hydrogen sulfide gas sensor, and are not repeated herein.

2.2. Electric Actuating Mechanism Selection and Interface Design

The electric actuating mechanism is a most important component in the system and is responsible for controlling the valve to rotate to a specified position accurately. A process of controlling the valve by the actuating mechanism requires that position signal output can be continuously and accurately controlled, and therefore, the following requirements are provided for the selection of the electric actuating mechanism: angle positioning is accurate; input-output dynamic responses are realized; stability is high, and a self-protection mechanism is provided; a switching time is short; the protection level is high; the selection can be controlled remotely and on site.

In the system, an angular-travel electric actuating mechanism is adopted to control the 90-degree opening-closing control ball valve. In order to meet diversified requirements of users, an integrally designed switch-type electric actuating mechanism and an integrally designed adjusting-type electric actuating mechanism are selected, the switch-type electric actuating mechanism is shown in FIGS. 3 to 7 and has a model of AOX-R-005, and the adjusting-type electric actuating mechanism is shown in FIGS. 3 to 8 and has a model of AOX-R-003P. Driving power of the two actuating mechanisms is AC220V AC power, the valve is controlled to rotate to the specified position through an output signal, an output torque is 50 N·M, and the protection level is IP67. The AOX-R-005 control signal has a high level and a low level; the AOX-R-003P control signal is a current signal ranging from 4→20 mA.

1. Switch-Type Electric Actuating Mechanism

Figure 5:
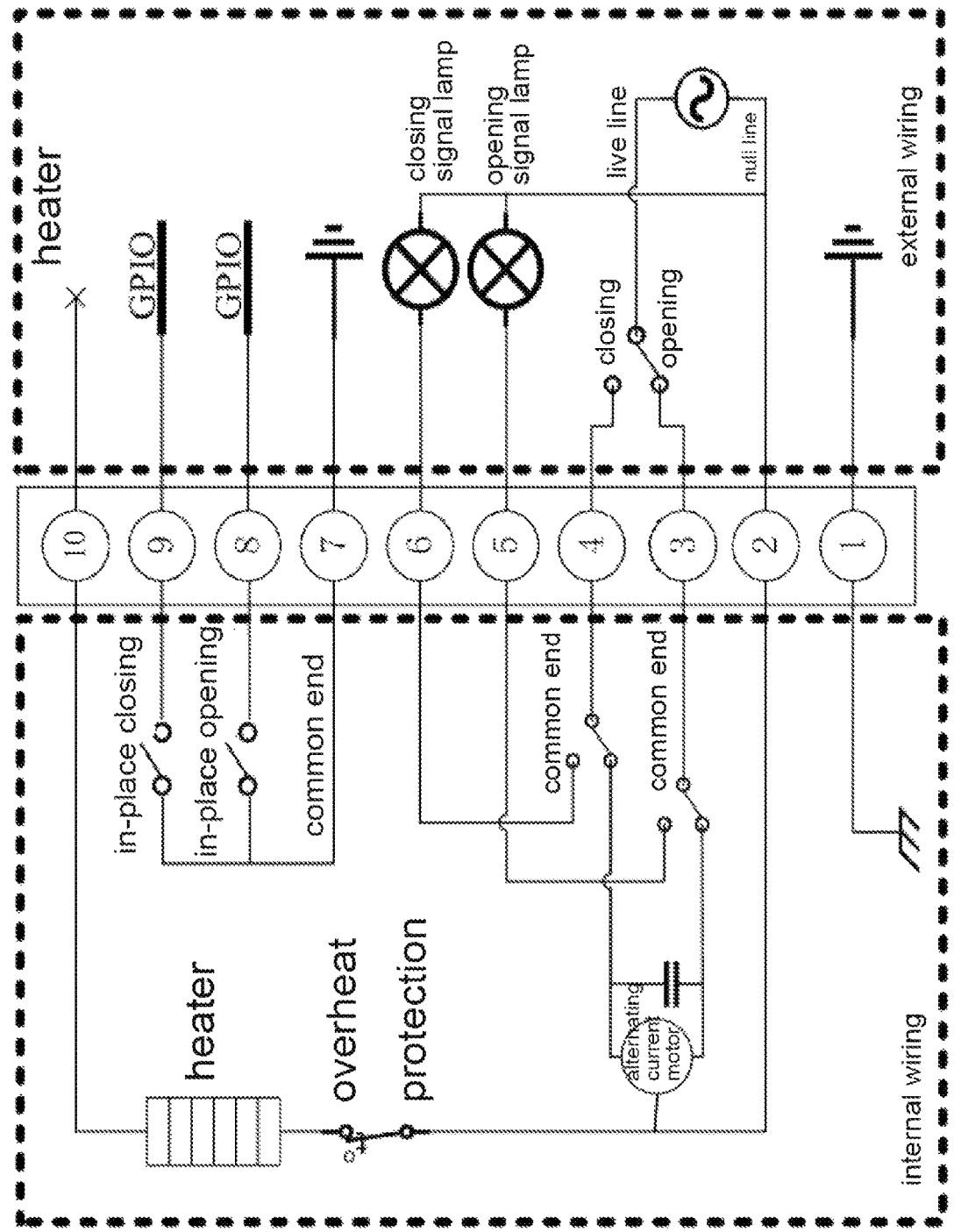
FIG. 5 shows a wiring diagram of a switch-type actuating mechanism in the present application.

The switch-type electric actuating mechanism is AOX-R-005, and a wiring diagram thereof is shown in FIG. 5.

Single-phase alternating current power controls power supply of an actuator, power input through pins 2 and 3 controls the actuating mechanism to be turned on, power input through the pins 2 and 4 controls the actuating mechanism to be turned off, and power is controlled by the relay to be connected with the pin 3 or 4 to control the actuating mechanism to be turned on or off. Pins 8 and 9 output the opening in-place signal and the closing in-place signal for passive feedback respectively. The opening in-place signal and the closing in-place signal are output at high and low levels, and the GPIO pin can be used for state acquisition.

2. Adjusting-Type Electric Actuating Mechanism

Figure 6:
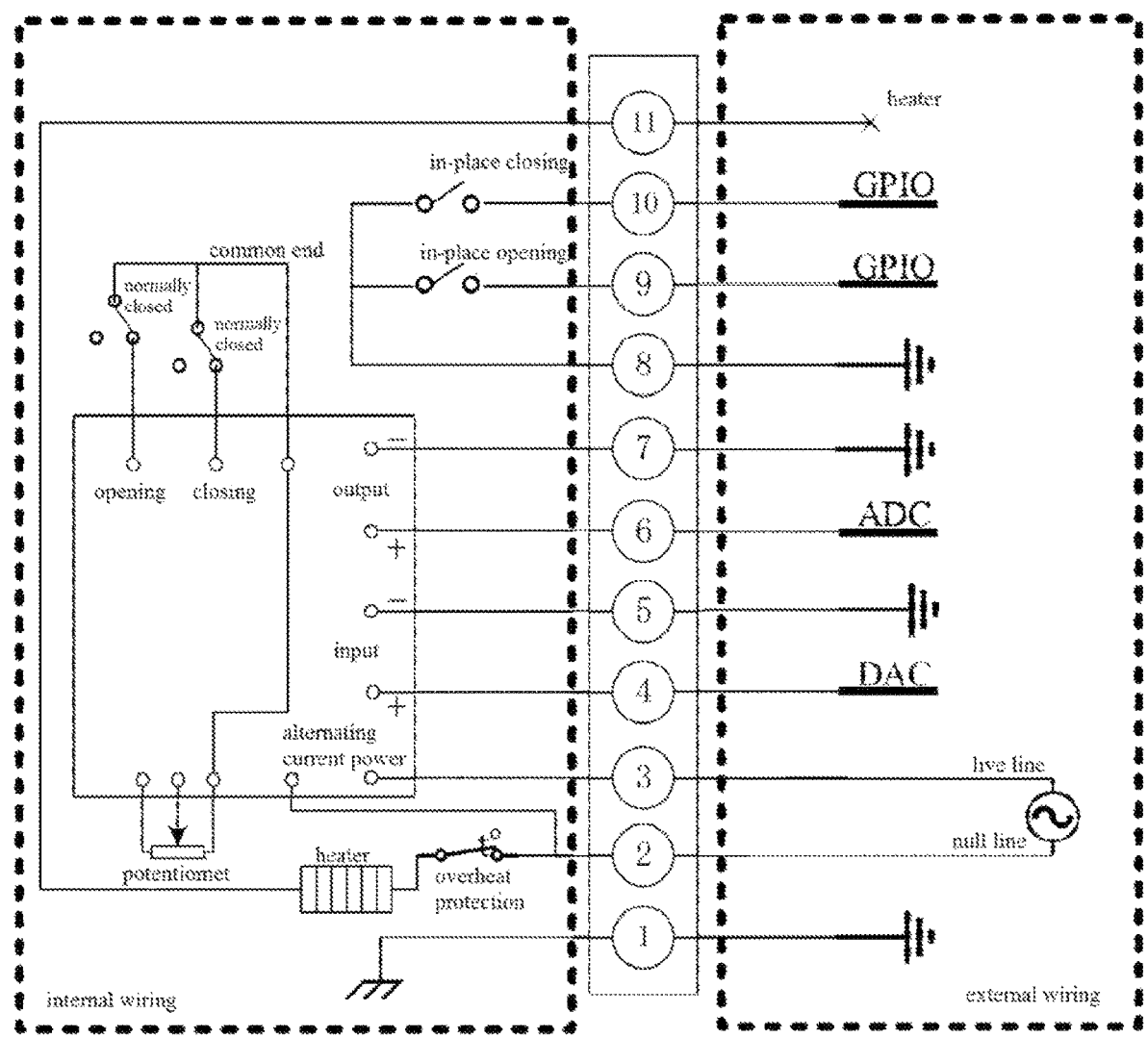
FIG. 6 shows a wiring diagram of an adjusting-type actuating mechanism in the present application.

The adjusting-type electric actuating mechanism is AOX-R-003P, a rotation angle of the actuating mechanism can be controlled according to an input current signal, and FIG. 6 is a wiring diagram thereof.

Single-phase alternating current power is input through pins 2 and 3 to supply power to the actuating mechanism. Pins 4 and 5 are connected with a positive electrode and a negative electrode of an input analog quantity signal; pins 6 and 7 are a positive electrode and a negative electrode of a feedback analog quantity; pins 9 and 10 are output pins for the opening in-place signal and the closing in-place signal of the actuating mechanism. A range of the input analog quantity of the actuating mechanism is a 4→20 mA current of the industrial design specification, the voltage signal is output by the DAC in the system, and the voltage signal is converted into a corresponding current by a GOSLING ASC-201 module to be input into the actuating mechanism; the output signal of the actuating mechanism is an analog quantity current signal ranging from 4→20 mA, and in the system, the collected actuating mechanism current signal is converted into an actual opening-closing angle digital quantity using the ADC by a GOSLING ASC-301 module; the opening in-place signal and the closing in-place signal are obtained by the GPIO pin as in the switch-type actuating mechanism. The above GOSLING ASC-201 module is a voltage-to-current module, and has input of 0→3.3V and output of 4→20 mA, the GOSLING ASC-301 module is a current-to-voltage module and has input of 4→20 mA and output of 0→3.3V, and control and monitoring requirements of the system for the actuating mechanism are met.

3. Terminal Software Program Design

The system terminal software design is carried out on the basis of a GEC architecture software platform and mainly includes a design of application components of the related sensors and electric actuating mechanisms and designs of flows of the main program and the interrupt processing program of the terminal software. All terminal components and programs of the system are subjected to code static defect detection using Cppcheck, and comprehensive inspection of code problems is realized in conjunction with a compiler to guarantee robustness of the terminal software.

3.1. System Application Component

In order to achieve the portability of the terminal software and reusability of the application components, data collection programs for the pull-press sensor, the $H_2S$ sensor and the $H_2$ sensor as well as a collection control program for the actuating mechanism used by the system are packaged into the application components with uniform interfaces and complete functions. This section explains in detail the design flows of each sensor application component and the actuating mechanism application component.

1. Sensor Component

The sensor application components are described below from sensor data collection flow methods, application component package designs, and component testing with the BSLM-6 diaphragm capsule pull-press sensor as an example.

1) Input-Output Analysis

Before the sensor data is collected, the input and output of the sensor are required to be determined first, so as to determine peripherals through which the sensor acquires the collected data, such as GPIO, ADC, UART, or the like. Then, whether a signal transmission way of the sensor is single-ended transmission or differential transmission is determined; for example, differential transmission is adopted in the pull-press sensor used in the system, and single-ended transmission is adopted in the gas sensor used in the system.

The output signal of the BSLM-6 diaphragm capsule pull-press sensor is a differential signal, the BSLM-6 diaphragm capsule pull-press sensor has two signal lines Sig+ (signal+) and Sig− (signal−), and is different from a traditional sensor with one signal line and one ground wire, the sensor simultaneously outputs data on the two signal lines, and real data is a difference value between the data of the two signal lines. The data output by the sensor is the analog quantity generated by the pull-press force, and the ADC port of the development board is required to be connected for analog data collection.

2) Sensor Data Collection

---
Algorithm 1: acquiring ADC data of the BSLM-6 diaphragm capsule pull-press sensor
---

Input: sensor access AD channel numbers AD_NO1 and AD_NO2, filtering time number K and a differential mode AD_DIFF
Output: sensor returned data PPValue
adc_init(AD_NO1, AD_DIFF)
adc_init(AD_NO2, AD_DIFF)
mid=0
for i = 0 to K do
   mid←mid + adc_read(AD_NO1)-adc_read(AD_NO2)
end
mid←mid/K
ad=0
for i = 0 to K do
   ad←ad + adc_read(AD_NO1)-adc_read(AD_NO2)
end
ad←ad/K
return PPValue←(mid − ad)/mid/50

---

First, the sensor signal line is connected with the ADC port of the development board, and an excitation line is connected with a corresponding high level and a corresponding low level, so as to ensure that the sensor collects true data and may be communicated with the development board. Since the BSLM-6 diaphragm capsule pull-press sensor has a measurement range of 0→±50 KG, a reference value is required to be adjusted to be half of an AD reference voltage in a no-load state after the sensor is connected, so as to ensure that data within the measurement range can be output. Then, the collected data of the two signal lines of the sensor is collected by the ADC using a mean or median filtering method, and a mean value of K sampling results is taken as an accurate value of one sampling result of the sensor. A value of K in the component is 12, and the larger the value of K is, the higher the smoothness of the signal is, and the lower the sensitivity is. Finally, physical quantity regression is performed, and the acquired sensor data is converted into a real pull-press value.

3) Sensor Component Packaging

In order to guarantee the portability and reusability of the terminal-related sensor software, a sensor data collection program is packaged into a uniform interface according to a data access flow of the sensor. According to the data collection flow of the sensor, the sensor component has three parts of module initialization, module reference initialization and pull-press value collection. Table 3 gives external function interfaces of components of the BSLM-6 diaphragm capsule pull-press sensor.

TABLE 3

Pull-press sensor component function

| Function name | Parameter | Returned value | Description |
|---|---|---|---|
| torque_init | ADC_NO1: signal+ channel number, ADC_NO2: signal− channel number | 0: success 1: failure | Initializing an ADC channel of the pull-press sensor using difference |
| torque_mid | cnt: filtering time number | Pull-press sensor reference value | Calibrating a reference value of a pull-press sensor module using the median filtering method |
| torque_ave | cnt: filtering time number | Pull-press sensor reference value | Calibrating the reference value of the pull-press sensor module using the mean filtering method |
| torque_get | method: filtering method cnt: filtering time number | Real pull-press value | Collecting the sensor data, and parsing the sensor data into the real pull-press value |

Other sensor connection flows and application component packaging methods are similar to those of the BSLM-6 diaphragm capsule pull-press sensor, and table 4 lists other sensor connection flows and application components.

TABLE 4

Other-sensor component function

| Sensor | Function name | Parameter | Returned value | Function description |
|---|---|---|---|---|
| H₂S sensor | H2S_init | ADC_NO: collection channel number | 0: success 1: failure | Initializing an H₂S sensor module data interface |
|  | H2S_get | None | H₂S concentration | Collecting sensor data, and parsing the sensor data into a real concentration value |
| H₂ sensor | H2_init | ADC_NO: collection channel number | 0: success 1: failure | Initializing an H₂ sensor module data interface |
|  | H2_get | None | H₂ concentration | Collecting sensor data, and parsing the sensor data into a real concentration value |

4) Sensor Component Testing

After the terminal application component is designed, accuracy testing is required to be carried out to guarantee reality of the data collected by the terminal, and a good basis is provided for a subsequent software design. Terminal testing human-computer interaction software of a PC end is designed using a VS2019 development tool and a C#language to perform the accuracy testing of the terminal application component.

The BSLM-6 diaphragm capsule pull-press sensor is connected into the development board, pulling and pressing operations are carried out at two ends of the sensor using weights, and analog signals are output through a serial port. The testing software is connected with the serial port of the development board, the pull-press value measured in real time is output, and a visual interface is provided to display a change of the pull-press value.

By comparing the real pull-press values of the BSLM-6 diaphragm capsule pull-press sensor with the measured values, data when an acting force of the sensor is unstable is removed, a mean square error between 100 pieces of terminal collection data and the real pull-press values is 0.0021 through calculation, and requirements of the system for pull-press value monitoring can be met. Testing flows of other sensors are similar to this process and are not repeated herein.

2. Electric Actuating Mechanism Component

Two electric actuating mechanisms are selected in the system, operations related to control of the actuating mechanism are packaged into the application component based on basic components, such as GPIO, ADC, DAC, or the like, so as to achieve portability and reusability of the operation of the actuating mechanism, and the control and state acquisition of the actuating mechanism are realized by means of function calling and parameter transfer.

The AOX-R-005 electric actuating mechanism is of a switch type, and for the control signal, only an opening-closing quantity is required to be input to determine whether an open channel or a closed channel is connected, and signal feedback of the actuating mechanism is also an opening-closing quantity and can be directly controlled and obtained by the GPIO. The AOX-R-005P electric actuating mechanism is of an adjusting type, the control signal is a 4→20 mA current signal, a corresponding digital signal is required to be converted into an analog signal by the DAC, and then, the analog signal is input into the actuating mechanism. The signal feedback of the actuating mechanism is also a 4→20 mA current signal, and a corresponding analog signal is required to be converted into a digital signal by the ADC. The actuating mechanism driving component function design is shown in table 5.

Whether the valve opening degree signal can be accurately acquired is a premise of detecting whether valve opening-closing angle control is successful, and in the system, a K-C703 S signal generator and a multimeter are used to perform a joint test in conjunction with the opening degree signal of the electric actuating mechanism. The signal generator is used for controlling the actuating mechanism to rotate to a specific angle, and the current opening degree signal value is acquired by the multimeter and the actuating mechanism application component to carry out the joint test, so as to ensure that the valve opening degree signal can be accurately collected. On this basis, an automatic testing program is compiled to check whether the valve opening-closing control is accurate. Since the opening-closing signal of the actuating mechanism has a range of 4→20 mA, and a time required by opening-closing state reversal is 30 seconds, an automatic testing terminal selects a random value from 4 to 20 to control the actuating mechanism to rotate, and after the control signal is sent out for 30 seconds, the signal of the actuating mechanism is obtained for comparison.

The test result shows that when connection is stable, the terminal can control the valve to be opened or closed to a fixed angle, an error of the control signal is within 0.2 mA, and part of data is shown in the table 6. The switch-type electric actuating mechanism only has two states of in-place opening and in-place closing, and high/low level signals are output by the GPIO pin to control the actuating mechanism to be opened/closed in place.

TABLE 5

Actuating mechanism application component function

| Function name | Returned value | Function description |
| --- | --- | --- |
| valve_switch_init | 0: successful initialization; 1: failed initialization | Initializing the switch-type actuating mechanism |
| valve_switch_get | 0: closing in place; 1: opening in place; 2: not in place | Acquiring an opening-closing state of the switch-type actuating mechanism |
| valve_switch_open | 0: success; 1: failure | Controlling the switch-type actuating mechanism to be opened in place |
| valve_switch_close | 0: success; 1: failure | Controlling the switch-type actuating mechanism to be closed in place |
| valve_adjust_init | 0: successful initialization; 1: failed initialization | Initializing the adjusting-type actuating mechanism |
| valve_adjust_get | 0-100: valve opening angle 0: closing in place; 100: opening in place | Acquiring opening-closing and angle states of the adjusting-type actuating mechanism |
| valve_adjust_open | 0: success; 1: failure | Controlling the adjusting-type actuating mechanism to be opened in place |
| valve_adjust_close | 0: success; 1: failure | Controlling the adjusting-type actuating mechanism to be closed in place |
| valve_adjust_angle | 0: success; 1: failure | Controlling the adjusting-type actuating mechanism to rotate by an angle |

TABLE 6

Valve opening degree signal control data (unit: mA)

| Control value | 14   | 20   | 5   | 4    | 17   | 19   | 15   | 20   | 11   | 14   |
|---|---|---|---|---|---|---|---|---|---|---|
| Signal value  | 14.2 | 19.8 | 5.1 | 4    | 17.1 | 18.9 | 15   | 20   | 11   | 14.1 |
| Control value | 17   | 19   | 4   | 20   | 6    | 9    | 17   | 16   | 13   | 20   |
| Signal value  | 17.1 | 18.9 | 4   | 19.8 | 6.1  | 8.8  | 17.1 | 15.9 | 13.2 | 20   |

3.2. Data Structure and Privacy Protection

The valve terminal is used as a sensing layer of the whole system and is a source of all data. A format of the data collected and sent by the terminal is determined based on a data structure design and a privacy protection design, so as to ensure that a server can be well communicated with the terminal.

1. Data Structure Design

FIG. 7 shows the data structure used and collected by the system terminal, so as to describe valve equipment and collection and control information.

A product information structure (FlashData) describes a product name, a belonging company, a network service address, or the like; an equipment information structure (UserData) includes valve terminal product information, NB-IoT communication information, valve terminal collection information, a sensor threshold and actuating mechanism control information, so as to realize storage of sensor and actuating mechanism data collection and a description of the operation range by the terminal.

2. Privacy Protection Design

In order to guarantee mutual authentication between the terminal and the server, in view of limitation of terminal computing resources and storage resources, in the present application, privacy protection is performed on terminal data based on reversible information hiding. The terminal and the server are required to negotiate a secret key and privacy data first, the secret key is a reversible matrix C, m×n pieces of privacy data are provided, and the terminal data privacy protection is realized by the following steps: (1) using an IMSI as a terminal identifier which is a mark for distinguishing mobile users, a number of an Internet of Things card used in the system having a length of 15 digits; generating, by the terminal, a random value b from [1,15], and taking a b-th digit of the IMSI number as a value of the terminal authentication identifier; (2) taking the data required to be protected by the terminal and the terminal authentication identifier as original data X having a dimension of m×n; (3) encrypting the original data X using the matrix C to obtain encrypted data Y, a formula being as follows:

$$Y_{i,j} = \sum_{k=1}^{n}(X_{i,k} + b)C_{k,j}. \quad (3.2)$$

(4) sending the encrypted data Y and the random value b to the server; (5) receiving, by the server, the data and parsing the data using an inverse matrix $C^{-1}$ of C to obtain the original data X, a formula being as follows:

$$X_{i,j} = \sum_{k=1}^{n} Y_{i,k} C_{k,j}^{-1} - b. \quad (3.3)$$

(6) performing authentication identifier verification, sending time verification and data frame integrity verification by the server, and if the verification is passed, performing subsequent operations of storage, forwarding, or the like, and if the verification is not passed, discarding the data.

Since the gas concentration collected by the terminal has a lower value under a normal condition and a condition where the value is 0 often exists, when the reversible information hiding algorithm is used in the system, the random value b is increased to avoid a condition where the encrypted data is the same as the real data due to improper reversible matrix selection. With the data privacy protection, the data in a transmission process is no longer the real data, and even if the terminal data is intercepted or leaked in the transmission process, the real data is not easy to parse. In the solution, only the data is converted, the whole data structure is not influenced, and therefore, privacy protection is performed after the terminal collects the data, and then, the protected data is sent to the server by a UECom component. Meanwhile, the data sent by the server to the terminal is also protected, and therefore, data protection software component functions are shown in table 7.

TABLE 7

Actuating mechanism application component function

| Function name    | Parameter                                      | Returned value            | Function description                          |
|---|---|---|---|
| sendData_encode  | valvedata: data array b: random value          | 0: success; 1: failure    | Performing privacy protection on the data array |
| backData_decode  | valvedata: data array b: random value          | 0: success; 1: failure    | Decrypting the data array                     |

When the terminal and the server negotiate the privacy data in the system, the data selected to be subjected to privacy protection includes 10 pieces of data including the sensor and actuating mechanism data collected by the terminal, server port and terminal authentication identifiers, or the like, which are of types of uint8_t and uint16_t before the privacy protection and have 11 bytes in total. In order to avoid data overflow, the terminal sets all privacy protection data to a type of int32_t, so as to ensure that the data can be parsed into the original data; a usage space for a type change is 40 bytes, and a sum of the usage space and a space occupied by the random value is 30 bytes more than a space occupied by the original data. After the calculation by the testing program compiled by the terminal, when a Vandermonde matrix is selected for the secret key, an encryption and decryption time is about 0.2 seconds in an actual use process, and an influence on a real-time performance of system data transmission is within an acceptable range. Since the data is limited to an integer type in the system, the solution is only suitable for privacy protection of the integer data type.

3.3.3. Terminal Main Program Flow

The main program of the system terminal is designed on the basis of the GEC architecture, so as to achieve the functions of collecting various kinds of data and controlling the electric actuating mechanism, send the terminal data to the server at regular time, and meanwhile correspondingly process and control the data sent back to the terminal by the server, thereby completing remote control operation of the whole system.

1. GEC Architecture Main Program Basis

GEC architecture software of STM32 achieves a function of communication between the terminal and the server on the basis of the NB-IoT communication component UECom. The UECom component is an NB-IoT communication component provided by the GEC architecture and designed based on the UART component, and is used for realizing data communication between the hardware terminal and the server. The main control chip sends a packaged AT instruction to a communication module through the UART, and the communication module also transmits feedback information to the main control chip through the UART, so as to achieve the function of communication between the hardware terminal and the server. When the main program of the terminal is designed in the system, the NB-IoT basic communication function can be completed only by changing and assigning the data structure.

2. Terminal Main Program Flow

Figure 8:
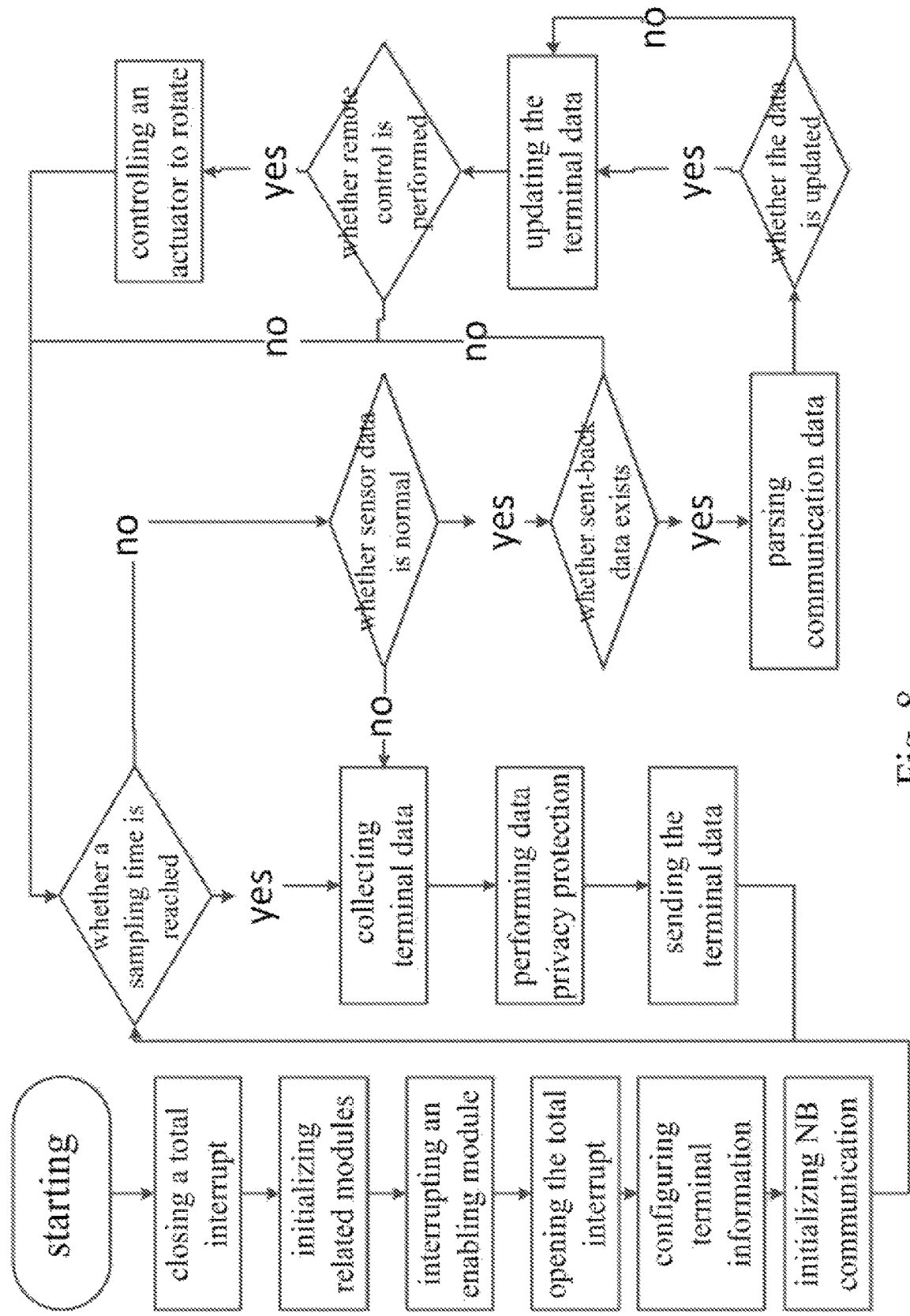
FIG. 8 shows a flow chart of a main program of a terminal in an embodiment of the present application.

A system terminal software implementation flow is shown in FIG. 8. The valve terminal and environment data collection function and the actuating mechanism control function are achieved, and meanwhile, the function of remotely and dynamically updating various terminal parameters and sensor thresholds is achieved. By increasing sensor threshold judgment and data privacy protection on the basis of the GEC framework main program and meanwhile modifying a processing function after the terminal receives data, the terminal can be guaranteed to execute a control instruction of the server.

3.4. Interrupt Processing Program

An opening-closing time (i.e., valve opening-closing time) in the running process of the valve is accurately calculated using an interrupt processing way in the terminal. In a program without an operating system, functions can only be executed in a set sequence, and requirements of real-time tasks or accurate calculation cannot be met. An interrupt processing function can be executed by generating a hardware interrupt when an interrupt source is triggered. In the system, an IO interrupt for time recording and a timer interrupt for overtime judgment are set for the valve opening-closing time. In conjunction with the above principle, taking an IO interrupt processing program for recording of the valve opening-closing time in the system as an example, the design flow is as follows:

(1) Interrupt program selection. When the switch-type actuating mechanism controls the valve to be opened in place, the relevant pin can continuously output a high level, otherwise, outputs a low level. According to an output way of the opening-closing signal of the actuating mechanism, the IO interrupt is adopted in the system, the interrupt source outputs a voltage level for the relevant pin, and an interrupt triggering way is double-edge triggering. The adjusting-type actuating mechanism judges an opening-closing position on this basis, thus ensuring that a time for controlling in-place opening or closing once is recorded.

(2) Interrupt program design. In the system, an interrupt service program for the valve opening-closing time is executed after the interrupt source is triggered. The interrupt service program for the valve opening-closing time mainly includes interrupt source signal verification and valve opening-closing time counting functions. Since a single-pin double-edge triggering way is adopted, in the interrupt source signal verification function, the system firstly judges a current interrupt triggering way. Meanwhile, the system filters abnormal voltage increase and decrease problems of the valve during rotation using 20 ms anti-shake verification. In the valve opening-closing time counting function, the system performs accurate time calculation by judging a time difference between a time stamp of interrupt starting and a time stamp after anti-shake verification. The system filters interrupt signals which are repeatedly triggered within five seconds. Comprehensively considering requirements of practical applications of the system, the basic hardware platform of GEC architecture NB-IoT communication including an STM32 microcontroller and an ME3616 module is selected, the selection and interface circuit design of the two main hardware components of the sensor and the actuating mechanism serve as entry points, and the electric valve terminal hardware is built based on the hardware components. On the basis of the GEC architecture software component, the sensor collection program is packaged into the application component with the uniform interface and complete functions, the terminal data structure is redesigned, privacy protection is carried out on important data, the flow of the main program of the terminal software is completed, and the functions of stable collection and accurate control of the terminal data are achieved.

What is claimed is:

1. A remote fault monitoring system for an electric valve, comprising:
    an MCU (Microcontroller Unit), a hydrogen sulfide sensor, a hydrogen sensor, a pull-press sensor and an actuating mechanism;
    wherein the pull-press sensor is connected with an A/D (Analog-to-Digital) conversion interface of the MCU by a signal amplifier, the hydrogen sulfide sensor and the hydrogen sensor are connected with the A/D conversion interface of the MCU by respective signal transmitters, and a D/A (Digital-to-Analog) conversion interface of the MCU is connected with an opening-degree control port of the actuating mechanism by a voltage-to-current transmitter; and
    wherein in the system, an interrupt service program for a valve opening-closing time is executed after an interrupt source is triggered, and the interrupt service program comprises interrupt source signal verification and valve opening-closing time counting functions; in the interrupt source signal verification, the system firstly judges a current interrupt triggering way, and meanwhile, the system filters abnormal voltage increases or decreases of the valve during rotation using 20 ms anti-shake verification; in the valve opening-closing time counting, the system performs time calculation by judging a time difference between a time stamp of interrupt starting and a time stamp after anti-shake verification, and the system filters interrupt signals which are repeatedly triggered within five seconds.

2. The system according to claim 1,
    wherein an opening in-place signal and a closing in-place signal of the actuating mechanism are connected with a GPIO (General Purpose Input/Output) input interface of the MCU, and a GPIO output interface of the MCU is connected with an opening control port and a closing control port of the actuating mechanism by actuating mechanism relays.

3. The system according to claim 1,
wherein the system further comprises an ME3616 module (an ultra-packet narrow band Internet of Things module with a dimension of 16*18 mm) matching circuit and an STM32 (a family of 32-bit microcontroller integrated circuits by STMicroelectronics) hardware minimum system which are connected with a UART (Universal Asynchronous Receiver-Transmitters) interface of the MCU, and the STM32 hardware minimum system is also connected with the signal amplifier and the voltage-to-current transmitter by a 5V to 24V voltage amplifier.

4. The system according to claim 1,
wherein the system further comprises an NB-IoT (narrow band Internet of Things) module which is connected with the MCU to transmit and receive the data of the MCU between the MCU and an external server.

5. The system according to claim 4,
wherein the system and the server negotiate a secret key and privacy data, the secret key is a reversible matrix C, m×n pieces of privacy data are provided, and the data privacy protection is realized by the following steps in the system:
(1) using an IMSI (International Mobile Subscriber Identification Number) as a terminal identifier of the system, generating, by the system, a random value b of [1,15], and taking a b-th digit of an IMSI number as a value of the terminal authentication identifier;
(2) taking the data required to be protected by the system terminal and the terminal authentication identifier as original data X having a dimension of m×n;
(3) encrypting the original data X using the matrix C to obtain encrypted data Y;
(4) sending the encrypted data Y and the random value b to the server;
(5) receiving, by the server, the data and parsing the data using an inverse matrix $C^{-1}$ of C to obtain the original data X;
(6) performing authentication identifier verification, sending time verification and data frame integrity verification by the server, and if the verification is passed, performing storage and forwarding operations, and if the verification is not passed, discarding the data.

6. The system according to claim 5,
wherein a formula of the encrypted data Y is:

$$Y_{i,j} = \sum_{k=1}^{n}(X_{i,k} + b)C_{k,j}.$$

7. The system according to claim 5,
wherein a formula of the original data X is:

$$X_{i,j} = \sum_{k=1}^{n} Y_{i,k} C_{k,j}^{-1} - b.$$

8. The system according to claim 1,
wherein the pull-press sensor is used for measuring a torque when the valve rotates, the actuating mechanism is used for controlling the electric valve to rotate by a worm and worm wheel structure, and the actuating mechanism controls a worm to drive a worm wheel to rotate.

9. The system according to claim 1,
wherein the actuating mechanism is a switch-type or adjusting-type electric actuating mechanism.

* * * * *